United States Patent [19]

Occhialini et al.

[11] Patent Number: 4,548,313

[45] Date of Patent: Oct. 22, 1985

[54] DEVICE FOR FORMING BATCHES OF BOX SHAPED PRODUCTS IN SIDE BY SIDE ROWS IN PARTICULAR OUT OF SUPPLY LINE INFED PARCELS LIABLE TO LOSE THEIR SHAPE

[75] Inventors: Giorgio Occhialini, S. Lazzaro di Savena; Gabrio Grazia, Bologna; Fausto Forlani, Mezzolara, all of Italy

[73] Assignee: Mac-Pack S.R.L., Italy

[21] Appl. No.: 495,470

[22] Filed: May 17, 1983

[30] Foreign Application Priority Data

Jun. 11, 1982 [IT] Italy ............................ 3457 A/82

[51] Int. Cl.$^4$ ............................................. B65G 25/00
[52] U.S. Cl. ............................... 198/430; 198/740; 198/468.1
[58] Field of Search ............ 198/425, 426, 427, 429, 198/430, 466, 487, 740, 800

[56] References Cited

U.S. PATENT DOCUMENTS

| | | | |
|---|---|---|---|
| 2,252,937 | 8/1941 | Link et al. | 198/426 |
| 2,390,725 | 12/1945 | McNamara et al. | 198/430 |
| 2,407,664 | 9/1946 | Herrold | 198/430 |
| 3,193,079 | 7/1965 | Winter et al. | 198/426 |
| 3,664,482 | 5/1972 | Kornylak | 198/800 X |
| 4,029,198 | 6/1977 | Lingl | 198/425 |

Primary Examiner—Robert J. Spar
Assistant Examiner—Jonathan D. Holmes
Attorney, Agent, or Firm—Darby & Darby

[57] ABSTRACT

A device for forming rows of products includes a photoelectric cell that is positioned in proximity of an element, downstream of the said supply line, against which the first infed parcel abuts, and upon being tripped actuates product blocking means located upstream of the said abutting element, at a predetermined distance greater than the dimension, or greater than a whole multiple of the dimension, of the parcel measured along the infeed direction. Placed above the terminal part of the supply line is a thrust element designed to displace horizontally the parcel, or row of parcels, to a waiting station where the batch is gradually formed. The said thrust element is constituted by a pair of arms supported cantilever fashion at the extremity of a lever rotatable around a horizontal axis parallel to the infeed direction, each arm extending vertically and resting at the rear of the said parcel at the time of its bottom horizontal travel, and rotating backwards at the time the parcel is released.

9 Claims, 6 Drawing Figures

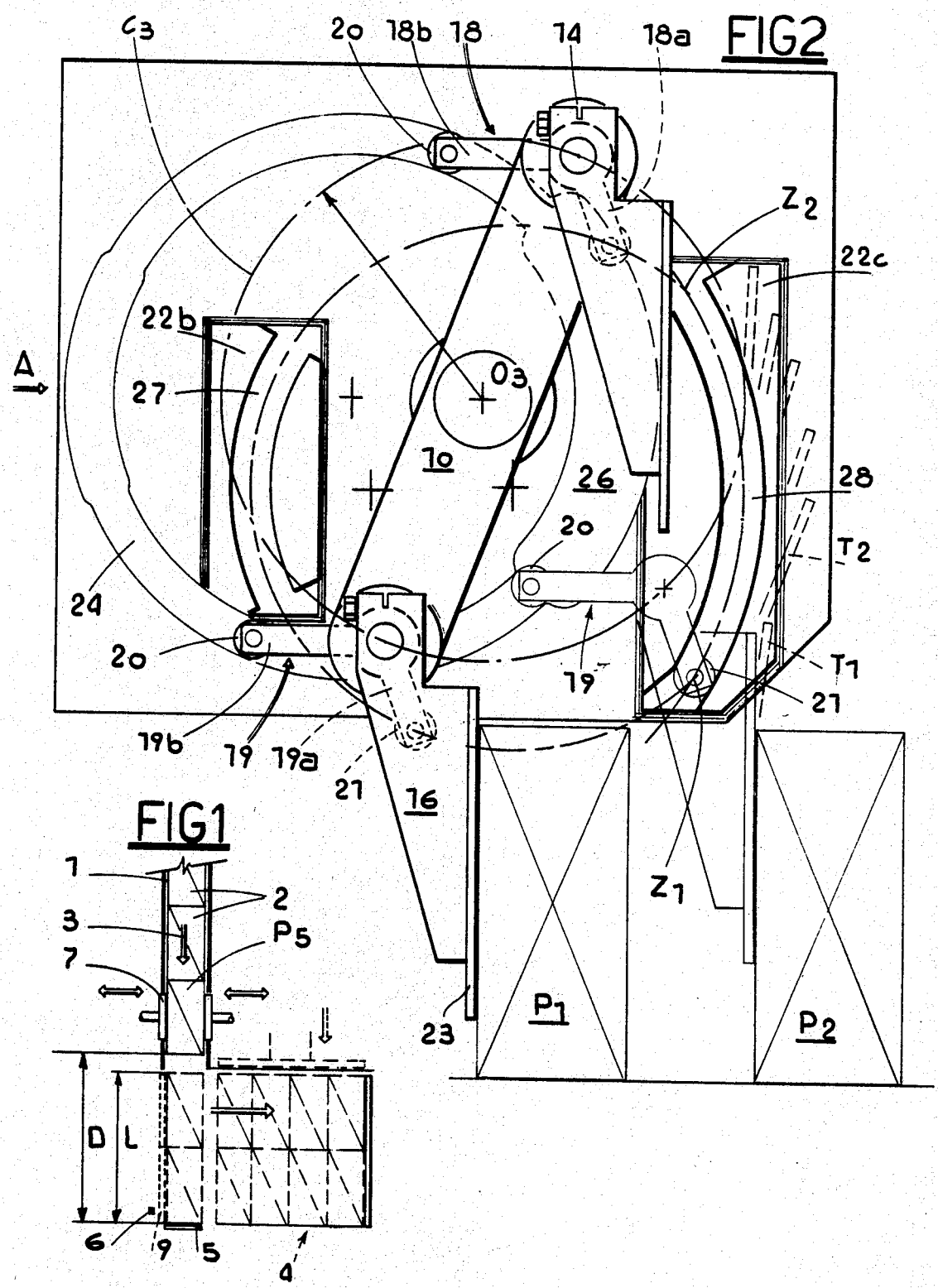

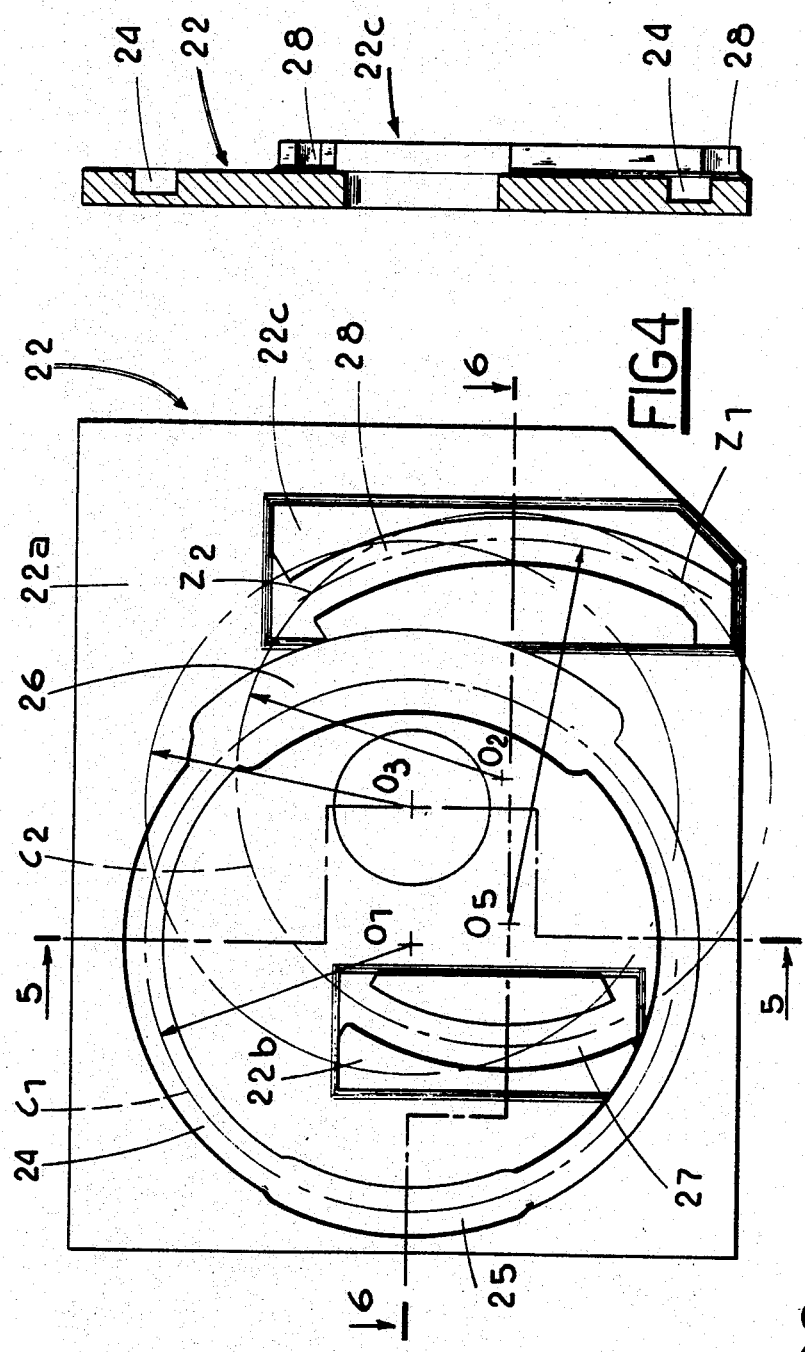

DEVICE FOR FORMING BATCHES OF BOX SHAPED PRODUCTS IN SIDE BY SIDE ROWS IN PARTICULAR OUT OF SUPPLY LINE INFED PARCELS LIABLE TO LOSE THEIR SHAPE

BACKGROUND OF THE INVENTION

The invention relates to a device placed in the terminal part of a plant for packaging box shaped products, in particular parcels liable to lose their shape, of the type wrapped in waterproof paper, in which the said parcels are grouped into batches of parallel rows prior to their being inserted into suitable containers ready to be transported to the sales and consumption points.

DESCRIPTION OF THE PRIOR ART

Plants currently in use comprise, in the section where the station for forming the parcels into batches is located, one or more transfer lines, each of which serves to convey, en masse, the parcels coming from the filling station.

Each of the said supply lines is provided, at its extremity, with a stop that hits against the first of the arriving parcels, while a blocking device placed upstream of the said stop, at a distance equal to a given number of parcels corresponding to one row, blocks the parcels arriving on the supply line, thereby allowing a lateral pusher member to thrust the two thus formed along towards the downstream batch forming station without, in the meantime, the products continuing to be infed.

At present use is made either of a rigid stop with which the blocked parcels are made to retract so as to have them easily separated from the row just formed, or else this is achieved through the use of a stop that gives elastically while the blocking device itself remains fixed.

Insofar as the lateral pusher member for the rows formed is concerned, the most widely adopted solution consists in the utilization of either a piston, generally pneumatic, or an endless chain provided with projecting parts that apply force onto the product to be moved. In the former case this means not excessively high output speeds, and in the latter, a certain constructional complication with space requirements that are not always available.

SUMMARY OF THE INVENTION

The essential object of the invention is, therefore, to construct a device able to lead to the formation of batches of box shaped products coming en masse from a supply line, at a high degree of operating speed that is, therefore, to the advantage of the productivity of the plane, with all this being achieved by a product pusher member that thrusts the product guided perfectly during its displacement without, therefore, any danger of the output rhythm being interrupted or of products to be rejected being included in the batches under formation.

This and other objects too are all attained with the device forming the subject of the invention, comprising a line for supplying the products being transferred en masse, one behind the other, under the action of a conveyor, an element for stopping the first parcel, placed downstream of the supply line, and of braking and blocking means placed along the path followed by the said products, the device comprising, furthermore, a pusher member placed at the side of the said line, between the said braking means and the said stop, and wherein there is a sensor placed in proximity of the stop, upstream of this with respect to the infeed direction of the products, designed to trip, once it has been intercepted by the leading parcel, the said braking means, the latter being placed upstream of the stop at a predetermined distance greater than the dimension, or greater than a whole multiple of the dimension, of the parcels measured along their infeed direction, the said pusher member comprising a pair of arms supported cantilever fashion at the extremity of a lever rotatable around a horizontal axis parallel to the infeed direction, each arm being keyed to an "L" shaped lever provided, at the extremities, with two rollers that are placed in separate vertical planes and slide coupled inside corresponding front vertical tracks, in such a way as to position, on each occasion, each of the said arms resting vertically at the rear of the said parcel at the time of its bottom horizontal travel, and in such a way as to rotate the said arms backwards at the time the parcel is released upon the displacement of this having been concluded.

BRIEF DESCRIPTION OF THE DRAWINGS

Further characteristics and advantages will become more apparent from the detailed description that follows, illustrated purely as an unlimited example on the accompanying drawings, in which:

FIG. 1 shows, in a diagrammatic plan view, the device forming the subject of the invention;

FIG. 2 shows, in a lateral view, the pusher member of the device in question in its various configurations;

FIG. 4 is a view, on a reduced scale, similar to FIG. 2, with components removed to illustrate the details of the tracks for the pusher member;

FIG. 5 is a sectional view taken along contour 5—5 in FIG. 4 and looking in the direction of the arrows; and FIG. 6 is a sectional view taken along contour 6—6 in FIG. 4 and looking in the direction of the arrows.

DESCRIPTION OF THE PREFERRED EMBODIMENT

Figure 3:
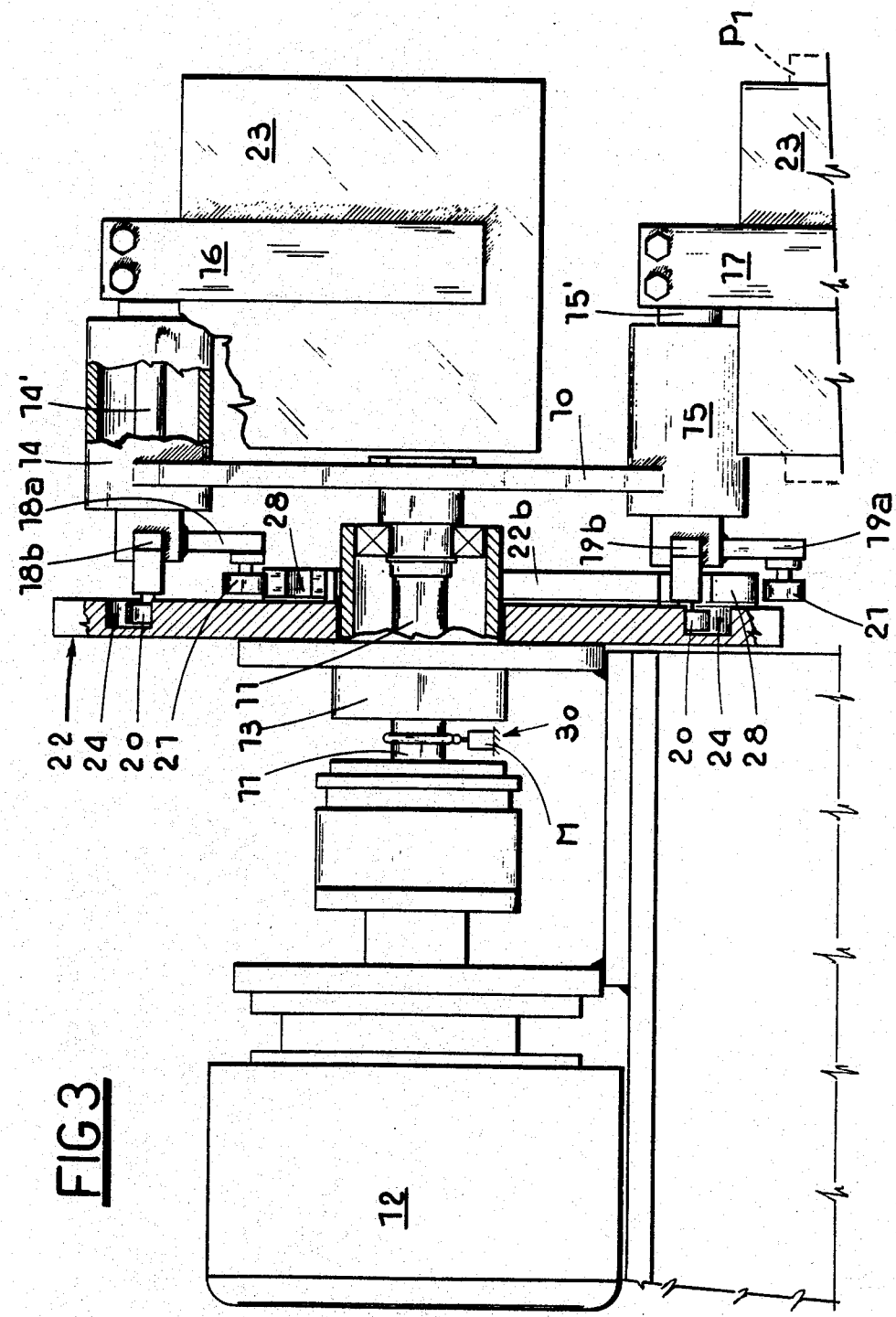
FIG. 3 shows the pusher member of FIG. 2 as viewed in the direction of arrow A of that figure.

With reference to FIG. 1, at 1 has been shown a line for supplying the products 2, namely parcels liable to lose their shape, that are movable one behind the other in the direction shown at 3, are forthcoming from an upstream processing line, and have to be grouped into batches of side by side rows, shown in dashes at 4, for them subsequentlyd to be sent, using means that are known, to boxing machines positioned downstream. In the form in which they are wrapped, the products are then ready to be put on the market.

Downstream of the supply line 1 there is an element 5 for stopping the leading parcel $P_1$ and immediately upstream of this, shown at 6, a product sensor (commonly a photoelectric cell) able to detect the presence of the parcels arriving and to cause the operation of braking and blocking means 7, placed at the side of the supply line, along the path followed by the products, at a distance D greater than the length L of each parcel measured long the said infeed direction 3 (or greater than a whole multiple of the length L, equal to two in the case described here).

Between the said stop 5 and the braking means 7, above the line 1, is placed a pusher member 9 for the products (in the case described the row is constituted by two parcels) that can be seen in detail in FIGS. 2-6.

The said member comprises a lever 10 keyed to a horizontal shaft 11, parallel to the infeed direction 3, carried in rotation by a motor 12 of the self-braking type and sustained by a central support 13. At its extremities, the said lever 10 is provided with two sleeves 14 and 15 that idly support two pins 14' and 15' to the extremities of which are keyed an arm 16 and 17 provided with a thrust element 23 and an "L" shaped lever 18 and 19, the two limbs 18-19a and 18-19b of which have at their extremities two rollers 20 and 21 designed to be inserted in the front tracks of a vertical plate 22 integral with the central support 13.

The said plate 22 (see FIGS. 4, 5 and 6) is virtually constituted by three separate parts that extend in two different planes. More precisely, the base 22a of the plate 22 has machined in it, a circular track 24 (center $O_1$-circumference $C_1$) on the opposite sides of which there are, for reasons that will be seen below, two sections of an increased width, namely 25 and 26.

On the base 22a there are two parts in relief 22b and 22c that constitute two sections of track 27 and 28 (the former with center $O_2$ and circumference $C_2$ of identical radius to that of the previously mentioned circumference $C_1$; the latter represents an arc of circumference with center $O_5$ and radius such as to intersect at $Z_1$ and $Z_2$ the preceding circumference $C_2$). The use of this solution with the tracks 27 and 28 placed in a plane higher than and differing from that of the track 24 is rendered necessary since the two circumferences $C_1$ and $C_2$ cross and intersect.

The width of the tracks corresponds to the diameter of the rollers 20 and 21 of the levers 18 and 19 that press into the said tracks.

Furthermore, the radius of the said circumferences $C_1$ and $C_2$ is identical to the radius of the circumference $C_3$ (center $O_3$) described by the lever 10, that is to say, during the rotation of the latter, the axes of the sleeves 14 and 15 and the centers $O_1$, $O_2$ and $O_3$ whose circumferences are identical in radius, are positioned, one with respect to the other, identically to the centers of the axes of the rollers 20 and 21 and of the sleeves 14 and 15, while the center $O_3$ is placed on the axis of rotation of the lever 10.

Shown at 30 in FIG. 3 there is a microswitch M energized by a pair of tripping elements placed on the shaft 11, one diametrically opposed with respect to the other, the said microswitch being placed in series with the photocell 6.

A description regarding the operation of the device now follows.

The parcelled products are infed in succession by the line 1 in direction 3 until the leading parcel $P_1$ obscures, by passing in front of it, the photocell 6 whereby the means 7 that brake the third parcel in the row (assuming two parcels at a time are thrust forward) are tripped. In this way the infeeding of all the parcels is blocked with the exception of the first two parcels which, for a short distance, continue their travel until parcel $P_1$ abuts against the stop 5, the said distance being sufficient, however, to bring about the spacing from the next parcel $P_5$.

At this juncture, if, stated, the photocell has detected the passing of the parcel, the microswitch M in series there with gives the lever 10 permission to continue its rotation and this causes the descent of the thrust element 23 which comes into position, vertically, at the back of the parcel $P_1$ (see FIG. 2), the said position being possible because of the support given to the lever 10 by the "L" shaped lever 19 and because of the coupling of the roller 20 inside the track 24, while the roller 21 is free.

By virtue of the circumferences $C_3$ and $C_1$ being identical, the "L" shaped lever 19 always stays, even during the continuation of the rotation of the lever 10, in the same position, namely with the thrust element 23 perfectly vertical. This section of rotation of the lever 10 corresponds, therefore, to the thrust and traversing of the parcel from the arrival position $P_1$ to the batching in rows position $P_2$.

When in this advanced position, the roller 21 starts to press down in the track 28 and this, being further in than the theoretical circumference $C_2$, obliges the "L" shaped lever 19 to undergo a small clockwise rotation, and the thrust element 23 to move gradually into the positions shown in dashes at $T_1, T_2 \ldots T_n$ in FIG. 2, thus progressively away from the rear side of the parcel $P_2$. This can be achieved thanks to the section 26 of an increased with with which the track 24 is provided, inside which the roller 20 is thus able to oscillate. The said situation persists until the track 28 is left, when the roller 20 engages anew in the original track 24 causing the "L" shaped lever 19 to return to its original position. In the meantime, the other "L" shaped lever 18 with the corresponding thrust element 23 will be positioned at the rear of a new parcel $P_1$, in this way reducing to a minimum down time.

The presence of the microswitch M is necessary for the timing of the complete operating cycle. In the absence of the 'parcel present' signal forthcoming from the photocell 6, when the said microswitch is tripped at the time the thrust element 23 is approaching the parcel $P_1$, it does in fact operate the self-braking motor 12 stop until the photocell is once again obscured.

The track 27, unlike the track 28, is made in a section of the circumference $C_2$ and it has the task of allowing the "L" shaped lever to remain in the horizontal position, and the thrust element 23 to remain in the vertical position, since otherwise, with the presence just of the track 24, it would tend to adopt angled positions in the section purposely defined by the track 25, with the risk of going and hitting or of jamming against the waiting parcel. Naturally the widened section 25 serves the same purpose as the previously mentioned widened section 26.

With the said solution it has been possible to construct a pusher member with a high operating speed (two strokes per revolution of the shaft 11), able at the same time to move the product without thrusting or releasing it in too brusque a fashion whereby even the overturning of the product could be occasioned.

In its practical embodiment, the invention can also adopt forms that differ from the one described herein and, in particular, numerous modifications of a practical nature may be made thereto, without, because of this, in any way deviating from the framework of protection afforded to the invention.

What is claimed is:

1. Device for forming batches of box-shaped products in n continuous side-by-side rows occupying a width L and advancing in an outfeed direction, the products being parcels liable to lose their shape and being supply line infed in an infeed direction generally perpendicular to the outfeed direction, the device comprising:

an infeed conveyor for supplying products being transferred, one behind the other, the conveyor having a terminal end;

means downstream of said conveyor in the infeed direction and spaced at a distance greater than L from said terminal end for stopping the movement in the infeed direction of parcels delivered from said terminal and;

externally actuable braking means positioned at said terminal end for selectively halting the delivery of said products from said terminal end;

a sensor located in proximity of the stopping means and upstream thereof in the infeed and outfeed directions and being no further from said means than the width of the product (L/n), the sensor being coupled to said braking means so as to actuate the same once it has been intercepted by a parcel, pusher means positioned at the side of said infeed conveyor, between said braking means and said stopping means, said pusher means comprising a rotary member mounted for rotation about a horizontal axis, a pair of pushing arms each mounted in pivoted cantilever fashion on said rotary member at a predetermined distance from said axis, a pair of generally L-shaped levers each mounted at its vertex to said rotary member for pivotal movement with a respective one of said levers, each lever having first and second rollers at its respective extremities, said first rollers lying in a first vertical plane perpendicular to said axis and said second rollers in a second vertical plane perpendicular to said axis, generally circular first guide track means in said first plane for slidingly receiving said first rollers, said first guide track means having a radius equal to said predetermined distance and being eccentric with respect to said rotary means, said first guide track means including a region of enlarged size in which a predefined degree of unguided movement of said first rollers is permitted, and second guide track means in said second plane for slidingly receiving said second rollers, said second guide track means including a guide track portion positioned and constructed to receive said second rollers while said first rollers are in said region of enlarged size, and track portion being generally in the form of a circumferential segment of a circle of diameter greater than said predetermined distance and eccentric with respect to said rotary means and said first track means, said pushing means being constructed and arranged so that the pushing arms successively engage said parcels while said pushing arms are near their positions of extreme vertical travel, said pushing arms being maintained upright, said first track being positioned so that said first rollers are also at their extreme vertical positions, whereby said pushing arms remain substantially upright during the time said parcels are engaged thereby, said portion of said second track being positioned to receive said second rollers when the respective pushing arm approaches its position of maximum forward travel, said first roller being disposed within said region of enlarged size, whereby the pushing arm is rotated so as to draw its lower end away from said parcel.

2. Device according to claim 1, further comprising a shaft on which said rotary member is mounted for rotation therewith, at least one microswitch and a pair of projections on said shaft, diametrically opposed one with respect to the other, said microswitch being placed in series with said sensor so as to block the rotation of said rotary member should said sensor fail to be tripped by the infed product.

3. A device in accordance with claim 1 further comprising a second enlarged region in said first track and a second portion of said second track positioned to receive each second roller while the respective first roller is in the second enlarged region, said second portion being in the shape of a circumferential segment of a circle having a radius equal to said predetermined distance and being eccentric with respect to said rotary member and said first track, said second portion being positioned to receive said second rollers when the respective pushing arm is in its position of rearmost travel, whereby said pushing arm maintains an upright, stationary attitude immediately prior to and upon engagement with a parcel.

4. A device according to claim 3 wherein said first guide track is formed as a groove in an upright plate and said second guide track is formed by a grooved component mounted on the surface of said plate.

5. A device according to claim 1 wherein said first guide track is formed as a groove in an upright plate and said second guide track is formed by a grooved component mounted on the surface of said plate.

6. In a device for forming batches of box-shaped products into continuous side-by-side rows advancing in an outfeed direction, the products being parcels liable to lose their shape, pusher means comprising:

a rotary member mounted for rotation about a horizontal axis, a pair of pushing arms each mounted in pivoted cantilevered fashion on said rotary member at a predetermined distance from said axis, a pair of generally L-shaped levers each mounted at its vertex to said rotary member for pivotal movement with a respective one of said levers, each lever having first and second rollers at its respective extremities, said first rollers lying in a first vertical plane perpendicular to said axis and said rollers in a second vertical plane perpendicular to said axis, generally circular first guide track means in said first plane for slidingly receiving said first rollers, said first guide track means having a radius equal to said predetermined distance and being eccentric with respect to said rotary means, said first guide track means including a region of enlarged size in which a predefined degree of unguided movement of said first rolles is permitted, and second guide track means in said second plane for slidingly receiving said second rollers, said second guide track means including a guide track portion positioned and constructed to receive said second rollers while said first rollers are in said region of enlarged size, said track portion being generally in the form of a circumferential segment of a circle of diameter greater than said predetermined distance and eccentric with respect to said rotary means and said first track means, said pushing means being constructed and arranged so that the pushing arms successively engage said parcels while said pushing arms are near their positions of extreme vertical travel, said pushing arms being maintained upright, said first track being positioned so that said first rollers are also at their extreme vertical positions, whereby said pushing arms remain substantially upright during the time said parcels are engaged thereby, said portion of said second track being positioned to receive said second rollers when the respective pushing arm approaches its position of maximum forward travel, said first roller being disposed within said region of enlarged size, whereby the pushing arm is rotated so as to draw its lower end away from said parcel.

7. A device in accordance with claim 6 further comprising a second enlarged region in said first track and a second portion of said second track positioned to receive each second roller while the respective first roller is in the second enlarged region, said second portion being in the shape of a circumferential segment of a circle having a radius equal to said predetermined distance and being eccentric with respect to said rotary member and said first track, said second portion being positioned to receive said second rollers when the respective pushing arm is in its position of rearmost travel, whereby said pushing arm maintains an upright, stationary attitude immediately prior to and upon engagement with a parcel.

8. A device according to claim 7 wherein said first guide track is formed as a groove in an upright plate and said second guide track is formed by a grooved component mounted on a surface of said plate.

9. A device according to claim 6 wherein said first guide track is formed as a groove in an upright plate and said second guide track is formed by a grooved component mounted on a surface of said plate.

* * * * *